US011159485B2

(12) United States Patent
Mayuzumi

(10) Patent No.: US 11,159,485 B2
(45) Date of Patent: Oct. 26, 2021

(54) COMMUNICATION SYSTEM, COMMUNICATION CONTROL APPARATUS, AND COMMUNICATION CONTROL METHOD USING IP ADDRESSES FOR RELAY SERVER MANAGING CONNECTIONS

(71) Applicant: Ryusuke Mayuzumi, Kanagawa (JP)

(72) Inventor: Ryusuke Mayuzumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 236 days.

(21) Appl. No.: 16/293,805

(22) Filed: Mar. 6, 2019

(65) Prior Publication Data
US 2019/0288986 A1    Sep. 19, 2019

(30) Foreign Application Priority Data

Mar. 19, 2018  (JP) .............................. JP2018-051806

(51) Int. Cl.
| G06F 21/55 | (2013.01) |
| H04L 29/06 | (2006.01) |
| G06F 21/56 | (2013.01) |

(52) U.S. Cl.
CPC ...... *H04L 63/0236* (2013.01); *H04L 63/0876* (2013.01); *H04L 63/126* (2013.01); *H04L 63/20* (2013.01)

(58) Field of Classification Search
None
See application file for complete search history.

(56) References Cited

U.S. PATENT DOCUMENTS 10,616,246 B2 *  4/2020  Kikuchi .............. H04L 63/0227
2005/0071650 A1 *  3/2005  Jo ....................... H04L 63/1425
                                                            713/188

(Continued)

FOREIGN PATENT DOCUMENTS

| JP | 2017-027353 | 2/2017 |
| JP | 2017-204722 | 11/2017 |

OTHER PUBLICATIONS

Protection from Distributed Denial of Service Attacks Using History-based IP Filtering . Peng. IEEE. (Year: 2003).*

(Continued)

*Primary Examiner* — Venkat Perungavoor
(74) *Attorney, Agent, or Firm* — Harness, Dickey & Pierce, P.L.C.

(57) ABSTRACT

A communication system includes a communication control apparatus, and one or more communication processing apparatuses, which reside on a network. The communication control apparatus includes a memory configured to store instructions which, when executed by one or more processors, causes the one or more processors to: in response to detection of unauthorized communication in the network, instruct a particular communication processing apparatus corresponding to an IP address of a source terminal of the unauthorized communication to transmit a packet-in message; determine whether the packet-in message transmitted from the particular communication processing apparatus is the unauthorized communication; when the packet-in message is the unauthorized communication, generate a first communication control rule that causes the particular communication processing apparatus to execute processing of blocking communication with an IP address of a terminal provided for the particular communication processing appa- (Continued)

ratus; and transmit the first communication control rule to the particular communication processing apparatus.

13 Claims, 9 Drawing Sheets

(56) References Cited

U.S. PATENT DOCUMENTS

| | | | |
|---|---|---|---|
| 2007/0022474 A1* | 1/2007 | Rowett | H04L 63/0218 726/11 |
| 2008/0222724 A1* | 9/2008 | Ormazabal | H04L 63/1441 726/23 |
| 2009/0126003 A1* | 5/2009 | Touboul | H04L 63/0245 726/13 |
| 2009/0222907 A1* | 9/2009 | Guichard | H04L 63/102 726/17 |
| 2010/0095367 A1* | 4/2010 | Narayanaswamy | H04L 63/20 726/12 |
| 2015/0312269 A1* | 10/2015 | Coskun | H04L 63/1408 726/22 |
| 2016/0308894 A1* | 10/2016 | Ahn | H04L 63/1425 |
| 2017/0149830 A1* | 5/2017 | Kim | H04L 63/1425 |
| 2017/0310709 A1* | 10/2017 | Foxhoven | H04L 61/1511 |
| 2018/0013645 A1* | 1/2018 | Baldi | H04L 43/026 |
| 2018/0083872 A1* | 3/2018 | Miller | H04L 63/0272 |
| 2019/0081952 A1* | 3/2019 | Wood | H04L 63/1491 |
| 2019/0141073 A1* | 5/2019 | Tsuchitoi | H04N 1/00 |
| 2019/0312911 A1* | 10/2019 | Rogers | H04L 63/0218 |
| 2019/0394169 A1* | 12/2019 | Yin | H04L 63/0263 |

OTHER PUBLICATIONS

Poisoning Network Visibility in Software-Defined Networks: New Attacks and Countermeasures. Hong. NDSS. (Year: 2015).*
Network attacks: Taxonomy, tools and systems. Hoque. ElSevier. (Year: 2015).*

* cited by examiner

| SWITCH LABEL | IP ADDRESS | Datapath ID |
|---|---|---|
| COMMUNICATION PROCESSING APPARATUS 20a | 192.168.0.10 | 0000000000000001 |
| COMMUNICATION PROCESSING APPARATUS 20b | 192.168.0.10 | 0000000000000002 |
| COMMUNICATION PROCESSING APPARATUS 20c | 192.168.0.100 | 0000000000000003 |
| COMMUNICATION PROCESSING APPARATUS 20d | 192.168.0.110 | 0000000000000004 |

FIG. 8

| ALERT LABEL | UNAUTHORIZED TERMINAL IP ADDRESS | ATTACK DESTINATION IP ADDRESS |
|---|---|---|
| DoS ATTACK | 192.168.0.200 | 123.45.67.89 |

FIG. 9

| ALERT LABEL | UNAUTHORIZED TERMINAL IP ADDRESS | ATTACK DESTINATION IP ADDRESS |
|---|---|---|
| DoS ATTACK | 192.168.0.10 | 123.45.67.89 |

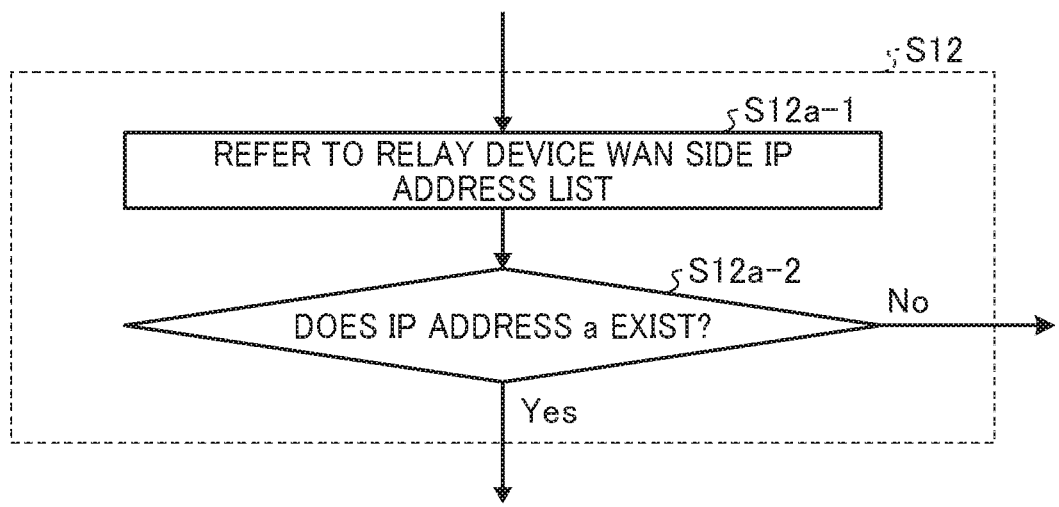
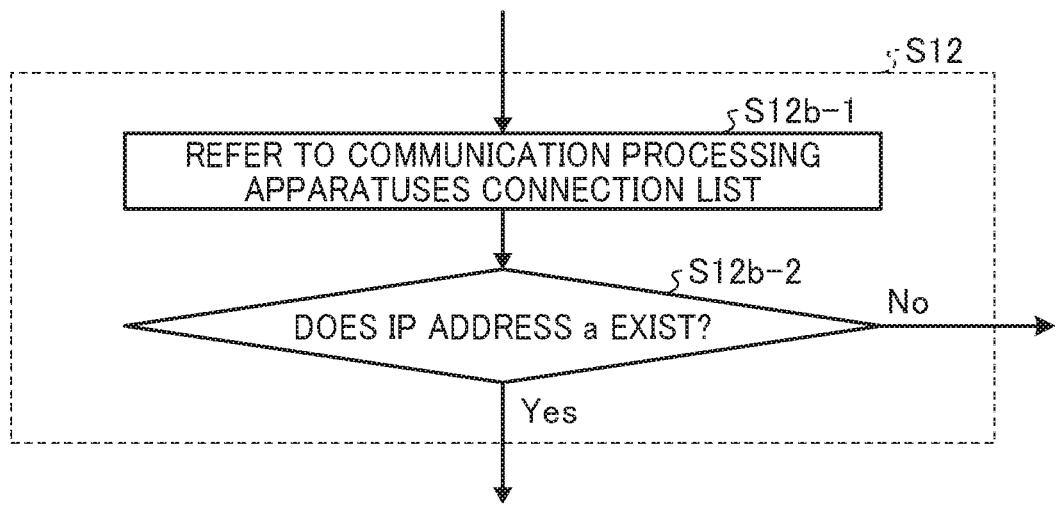

FIG. 15

| Match | Action | Priority |
|---|---|---|
| src_ip = ip_a | Drop | 10 |
| any | TRANSFER BY L2/L3 FUNCTION | 1 |

FIG. 16

| Match | Action | Priority |
|---|---|---|
| dst_ip = ip_op | TRANSFER BY L2/L3 FUNCTION | 20 |
| src_ip = ip_a | Drop | 10 |
| any | TRANSFER BY L2/L3 FUNCTION | 1 |

COMMUNICATION SYSTEM, COMMUNICATION CONTROL APPARATUS, AND COMMUNICATION CONTROL METHOD USING IP ADDRESSES FOR RELAY SERVER MANAGING CONNECTIONS

CROSS-REFERENCE TO RELATED APPLICATION

This patent application is based on and claims priority pursuant to 35 U.S.C. § 119(a) to Japanese Patent Application No. 2018-051806, filed on Mar. 19, 2018, in the Japan Patent Office, the entire disclosure of which is hereby incorporated by reference herein.

BACKGROUND

Technical Field

The present disclosure relates to a communication system, a communication control apparatus, and a communication control method.

Description of the Related Art

In recent years, in an organization such as a corporation, a local area network (LAN) is set up by at least one of wired and wireless communications (referred to as intra-organization LAN), and terminals used in the organization are communicably connected with each other via the intra-organization LAN. In order to handle an unauthorized attack on each of the terminals in the network such as the intra-organization LAN, a system referred to as a unified threat management (UTM) system exists. The UTM system monitors communications between inside and outside of the network to detect various types of behaviors and threats.

SUMMARY

According to an embodiment of the present disclosure, a communication system includes a communication control apparatus, and one or more communication processing apparatuses. The communication control apparatus and the one or more communication processing apparatuses reside on a network. The communication control apparatus includes a memory configured to store a plurality of instructions which, when executed by one or more processors, causes the one or more processors to: in response to detection of unauthorized communication in the network, instruct a particular communication processing apparatus corresponding to an IP address of a source terminal of the unauthorized communication to transmit a packet-in message; determine whether the packet-in message transmitted from the particular communication processing apparatus is the unauthorized communication; when a determination result indicates that the packet-in message transmitted from the particular communication processing apparatus is the unauthorized communication, generate a first communication control rule that causes the particular communication processing apparatus to execute processing of blocking communication with an IP address of a terminal provided for the particular communication processing apparatus; and transmit the first communication control rule to the particular communication processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is an illustration of a first example of unauthorized terminal information, according to an embodiment of the present disclosure;

FIG. 9 is an illustration of a second example of the unauthorized terminal information, according to an embodiment of the present disclosure;

FIG. 11 is a flowchart of a first example of an operation of determining an Internet Protocol (IP) address "a" that is predicted as an IP address of a source terminal of unauthorized communication, according to an embodiment of the present disclosure;

FIG. 12 is a flowchart of a second example of an operation of identifying the IP address "a" that is predicted as the IP address of the source terminal of the unauthorized communication, according to an embodiment of the present disclosure;

FIG. 15 is an illustration of a first example of a flow table constituting communication control rules, according to an embodiment of the present disclosure; and FIG. 16 is an illustration of a second example of the flow table constituting the communication control rules, according to an embodiment of the present disclosure.

Figure 1:
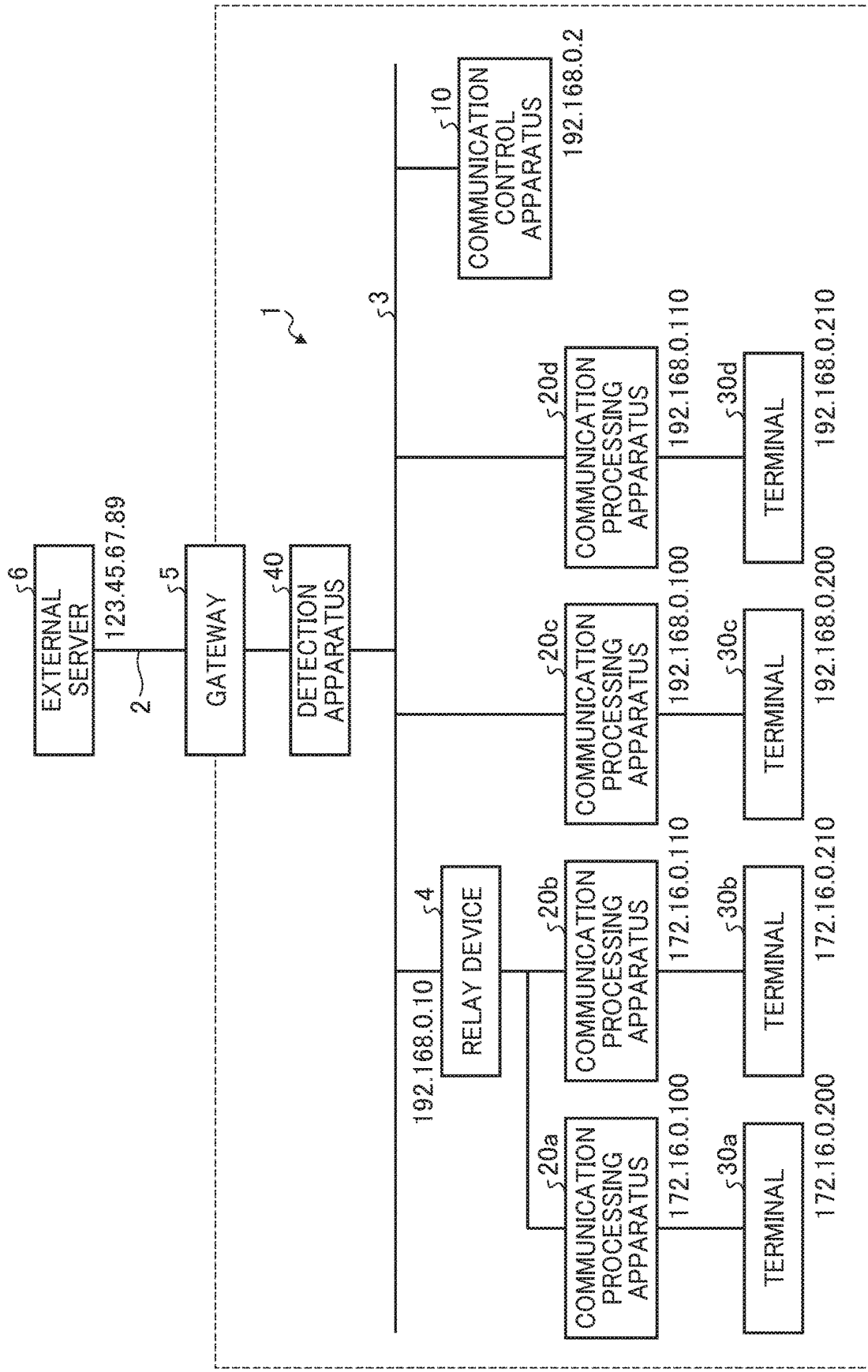
FIG. 1 is a block diagram of an example of a configuration of a communication system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A communication control apparatus has been known that monitors communications in a network on the basis of a global address of an unauthorized attack server received from a detection apparatus on the outside of the network and collates a global address in each of the communications with the global address of the unauthorized attack server, so as to specify a local address of a counterpart in the matching communication and block the communication of a terminal using an edge device (a software-defined network (SDN) switch).

The above-described communication control apparatus monitors the communications in an intra-organization LAN to specify and block the terminal that communicates with an external server identified as the unauthorized server. However, in the case where the server identified as the unauthorized attack server is a sound attacked server, the communication control apparatus mistakenly blocks the communication of the sound terminal with the attacked server. The communication control apparatus further blocks and isolates the communication of the terminal identified as making the unauthorized communication.

A communication system according to an embodiment described below prevents blockage of communications of terminals other than the terminal making unauthorized communication. As a result, network security is ensured without compromising convenience.

A detailed description is given of an embodiment of a communication system, a communication control apparatus, a communication control method, and a communication control program with reference to the accompanying drawings.

FIG. 1 is a block diagram of an example of a configuration of the communication system according to the embodiment. In the example illustrated in FIG. 1, a communication system 1 includes a communication control apparatus 10, communication processing apparatuses 20a, 20b, 20c, and 20d, terminals 30a, 30b, 30c, and 30d, and a detection apparatus 40.

The communication processing apparatuses 20a, 20b, 20c, and 20d are respectively provided for the terminals 30a, 30b, 30c, and 30d. The communication processing apparatus 20a is provided corresponding to the terminal 30a. The communication processing apparatus 20b is provided corresponding to the terminal 30b. The communication processing apparatus 20c is provided corresponding to the terminal 30c. The communication processing apparatus 20d is provided corresponding to the terminal 30d. At least one group of the communication processing apparatuses 20a, 20b, 20c, and 20d and the terminals 30a, 30b, 30c, and 30d may further include additional units.

In the example illustrated in FIG. 1, the communication processing apparatus 20a and the communication processing apparatus 20b are connected to the communication control apparatus 10 on a network 3 via a relay device 4. Meanwhile, in the example illustrated in FIG. 1, the communication processing apparatus 20c and the communication processing apparatus 20d are directly connected to the communication control apparatus 10 on the network 3 without interposing the relay device 4.

The network 3 is a private network such as the intra-organization LAN. The network 3 and a network 2, which is a global network such as the Internet, are interconnected via a gateway 5.

The relay device 4 has a network address port translation (NAPT) function. The communication processing apparatus 20a and the communication processing apparatus 20b share one wide area network (WAN) side IP address of the relay device 4 ("192.168.0.10" in the example illustrated in FIG. 1). More specifically, when data is transmitted from the communication processing apparatus 20a and the communication processing apparatus 20b, the relay device 4 translates an IP address of the communication processing apparatus 20a ("172.16.0.100" in the example illustrated in FIG. 1) and an IP address of the communication processing apparatus 20b ("172.16.0.110" in the example illustrated in FIG. 1) into the one WAN side IP address of the relay device 4 as a transmission source. In contrast, when one of the communication processing apparatus 20a and the communication processing apparatus 20b receives the data, the relay device 4 translates the WAN side IP address into the IP address of corresponding one of the communication processing apparatus 20a and the communication processing apparatus 20b as a reception destination.

The detection apparatus 40 is provided on the network 3. In the example illustrated in FIG. 1, the detection apparatus 40 is connected between the gateway 5 and the network 3.

The communication control apparatus 10 is provided on the network 3, which is the same network as the network of the detection apparatus 40. The communication control apparatus 10 establishes communication connection with each of the communication processing apparatuses 20a, 20b, 20c, and 20d according to a software-defined networking protocol called "OpenFlow®", for example. The communication control apparatus 10 can instruct each of the communication processing apparatuses 20a, 20b, 20c, and 20d to change a communication control rule, which will be described later, and the like, for example.

Here, OpenFlow will be described. OpenFlow is one of methods (protocols) for controlling the communications on a virtualized network. OpenFlow can grasp each of the communications as an end-to-end flow, and can execute path control, load distribution, optimization, and the like for each of the flows. More specifically, instead of analyzing and transferring each data packet in an autonomous distributed manner in the relay device or the like on a data communication path, OpenFlow is implemented by analyzing and transferring each of the data packets in an integrated control manner.

In OpenFlow, a "control plane" which analyzes the data, determines a transfer destination, and executes determination control, and a "data plane" which is a portion responsible for physical transmission of the packets are separated from each other. In OpenFlow, the communication control apparatus 10, which controls the control plane, instructs the communication control rule, and each of the communication processing apparatuses 20a, 20b, 20c, and 20d, which serves as the data plane, transfers the packets in accordance with the instruction of the communication control apparatus 10. More specifically, each of the communication processing apparatuses 20a, 20b, 20c, and 20d transfers the packets in accordance with a flow entry that is provided in a flow table of corresponding one of the communication processing apparatuses 20a, 20b, 20c, and 20d and added and rewritten by the communication control apparatus 10.

Each of the communication processing apparatuses 20a, 20b, 20c, and 20d identifies the packet on the basis of header information of the packet. The header includes 12 types of header fields that are a "reception port", a "transmission source media access control (MAC) address", a "destination MAC address", a "protocol type", a "virtual local area network (VLAN) ID", a "VLAN Priority Code Point (PCP) value", a "transmission source IP address", a "destination IP address", a "protocol number", a "type of service (ToS) value", a "transmission source port number", and a "destination port number". A wildcard character is set in the header field not used for the identification. In this way, any header field can be used as an identification condition.

In the case where a communication path called an OpenFlow (OF) channel is established between the communication control apparatus 10 and each of the communication processing apparatuses 20a, 20b, 20c, and 20d after activation of the communication system 1, the communication control apparatus 10 transfers the flow table and the flow entry to each of the communication processing apparatuses 20a, 20b, 20c, and 20d. After the OF channel is established, each of the communication processing apparatuses 20a, 20b, 20c, and 20d stores the flow table and the flow entry, which are transferred from the communication control apparatus 10 in accordance with a Modify-State message, as the flow table and the flow entry for initial setting in memory.

In the OpenFlow, an aggregate of the communications having the same rule will herein be referred to as a "flow". For example, the communications of a series of the packets, which have the same destination IP address, and, on each of which the same processing is executed, constitute the single flow. The communication control apparatus 10 instructs the communication processing apparatuses 20a, 20b, 20c, and 20d on the flow defined by a user. Each of the communication processing apparatuses 20a, 20b, 20c, and 20d registers the instructed flow as the flow entry in the flow table. The flow entry includes a combination of a condition (Match) for discriminating among the packets and operation (Action) at the time when the packet, which is discriminated in accordance with the condition, is received. The 0 or more flow entries are registered in the flow table. That is, in an initial state of each of the communication processing apparatuses 20a, 20b, 20c, and 20d, the flow table does not include the flow entry.

By using such a mechanism, OpenFlow can be used as a tool for controlling the virtualization of the network described above.

Figures 2, 3:
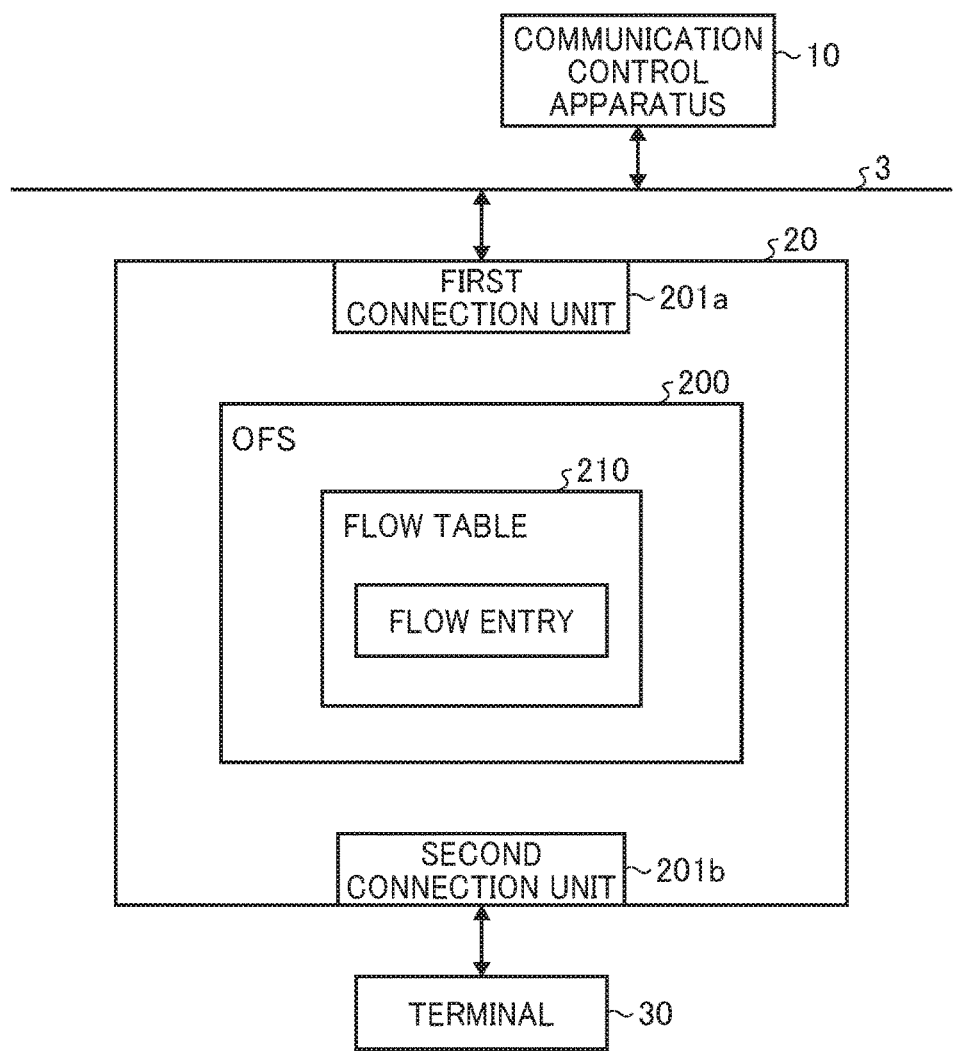
FIG. 2 is a table of an example of a communication processing apparatuses connection list, according to an embodiment of the present disclosure.
FIG. 3 is a conceptual diagram of an example of a configuration of a communication processing apparatus, according to an embodiment of the present disclosure.

FIG. 2 is a table of an example of a communication processing apparatuses connection list. The communication control apparatus 10 saves the communication processing apparatuses connection list illustrated in FIG. 2. In FIG. 2, as the communication processing apparatuses connection list, switch labels, the IP addresses, and Datapath IDs of the communication processing apparatuses 20a, 20b, 20c, and 20d are associated with each other, and each of the Datapath IDs is a switch-specific ID.

An IP address ("192.168.0.2" in the example illustrated in FIG. 1) of the communication control apparatus 10 is preset for the communication processing apparatuses 20a, 20b, 20c, and 20d. After the activation of the communication system 1, each of the communication processing apparatuses 20a, 20b, 20c, and 20d establishes the OF channel with the communication control apparatus 10 by using the IP address and a port number of the communication control apparatus 10. When the OF channels are established, the communication control apparatus 10 inquires the communication processing apparatuses 20a, 20b, 20c, and 20d as connection sources about the IP addresses and the Datapath IDs as the switch-specific IDs of the communication processing apparatuses 20a, 20b, 20c, and 20d. Then, the communication control apparatus 10 saves the IP addresses and the Datapath IDs of the communication processing apparatuses 20a, 20b, 20c, and 20d as the communication processing apparatuses connection list illustrated in FIG. 2.

FIG. 3 is a conceptual diagram of an example of a configuration of the communication processing apparatus according to the embodiment. A communication processing apparatus 20 exemplified in FIG. 3 corresponds to each of the above-described communication processing apparatuses 20a, 20b, 20c, and 20d. When being collectively referred, the above-described communication processing apparatuses 20a, 20b, 20c, and 20d will be referred to as the communication processing apparatus 20 below.

In FIG. 3, the communication processing apparatus 20 includes: an OF switch (OFS) 200 that is operated as a process; and a first connection unit 201a and a second connection unit 201b by one of a physical interface and a virtual interface. The OFS 200 establishes logical port connection with the first connection unit 201a and the second connection unit 201b, and a port number "1" and a port number "2" are assigned as management numbers to the ports.

The OFS 200 includes a flow table 210. The flow table 210 constitutes the communication control rule to be added and rewritten by the communication control apparatus 10. The flow table 210 includes the 0 or more flow entries.

In the example of the communication processing apparatus 20a, the terminal 30a is connected to the second connection unit 201b, and the relay device 4 is connected to the first connection unit 201a. In the example of the communication processing apparatus 20b, the terminal 30b is connected to the second connection unit 201b, and the relay device 4 is connected to the first connection unit 201a. In the example of the communication processing apparatus 20c, the terminal 30c is connected to the second connection unit 201b, and the network 3 is connected to the first connection unit 201a. In the example of the communication processing apparatus 20d, the terminal 30d is connected to the second connection unit 201b, and the network 3 is connected to the first connection unit 201a. When being collectively referred, the above-described terminals 30a, 30b, 30c, and 30d will be referred to as the terminals 30 below.

The communication processing apparatus 20 mediates the communication between the terminal 30 and the network 3. The communication control apparatus 10 transmits the Modify-State message defined in the OpenFlow to the communication processing apparatus 20 via the network 3. In this way, the communication control apparatus 10 can set the flow entry provided in the flow table 210 of the communication processing apparatus 20.

As described above, in the case where the relay device 4 exists between the communication control apparatus 10 and each of the communication processing apparatus 20a and the communication processing apparatus 20b, in the communication from each of the communication processing apparatus 20a and the communication processing apparatus 20b to the communication control apparatus 10, the IP address of each of the communication processing apparatus 20a and the communication processing apparatus 20b is translated into the WAN side IP address of the relay device 4 as the transmission source. At this time, as the IP addresses of the communication processing apparatus 20a and the communication processing apparatus 20b, the communication control apparatus 10 recognizes both of the originally-assigned IP address of the communication processing apparatus 20a ("172.16.0.100" in the example illustrated in FIG. 1) and the originally-assigned IP address of the communication processing apparatus 20b ("172.16.0.110" in the example illustrated in FIG. 1) as the WAN side IP address of the relay device 4 ("192.168.0.10" in the example illustrated in FIG. 1) as the transmission source.

The communication control apparatus 10 and each of the communication processing apparatuses 20a, 20b, 20c, and 20d maintain Transmission Control Protocol (TCP) connection. Thus, even in the case where the relay device 4 having the NAPT function exists on the network 3, the communication control apparatus 10 can instruct the specific communication processing apparatus (at least one of the communication processing apparatus 20a and the communication processing apparatus 20b in this case) to change the communication control rule and the like by designating the Datapath ID.

When receiving the packet from the terminal 30 via the second connection unit 201b, the communication processing apparatus 20 reads the header information described at a head of the packet and analyzes the read header information. The header is provided for each of the protocols applied to the packet communication, and the communication processing apparatus 20 can extract specific information from a header of a transport layer or lower in an Open Systems Interconnection (OSI) reference model. Examples of the header information extracted by the communication processing apparatus 20 are the MAC addresses, the IP addresses, TCP port numbers, and User Datagram Protocol (UDP) port numbers of the transmission source and the destination.

The communication processing apparatus 20 collates these pieces of the information extracted from the header information with the conditions (Match) defined by the flow entries provided in the flow table 210. More specifically, the communication processing apparatus 20 collates the information with the condition (Match) in a descending order of priority of the flow entries in the flow table 210.

At a time point of detecting the flow entry, the condition (Match) of which matches the received packet, from the flow table 210, the communication processing apparatus 20 interrupts the collation of the information with the conditions (Match), and performs the operation (Action) corresponding to the detected flow entry.

On the contrary, in the case where the communication processing apparatus 20 does not detect the flow entry, the condition of which matches the received packet, from the flow table 210, the communication processing apparatus 20 notifies the communication control apparatus 10 of a packet-in message including the received packet and inquires processing.

The packet-in message is a message that is used to transmit the received packet to the communication control apparatus 10 in the case where the flow entry, the condition of which matches the received packet, is not detected in the flow table. Thus, the packet-in message can be used as a message notifying reception of the packet from an unknown transmission source.

In addition to transmitting or discarding the packet, the communication processing apparatus 20 can rewrite the header information of the packet. By rewriting the addresses of the destination and the transmission source, it is possible to implement equivalent functions to network address translation (NAT) and an existing network device such as a router and to implement dynamic communication control, which is difficult to be implemented with the existing network device, depending on applications.

Figure 4:
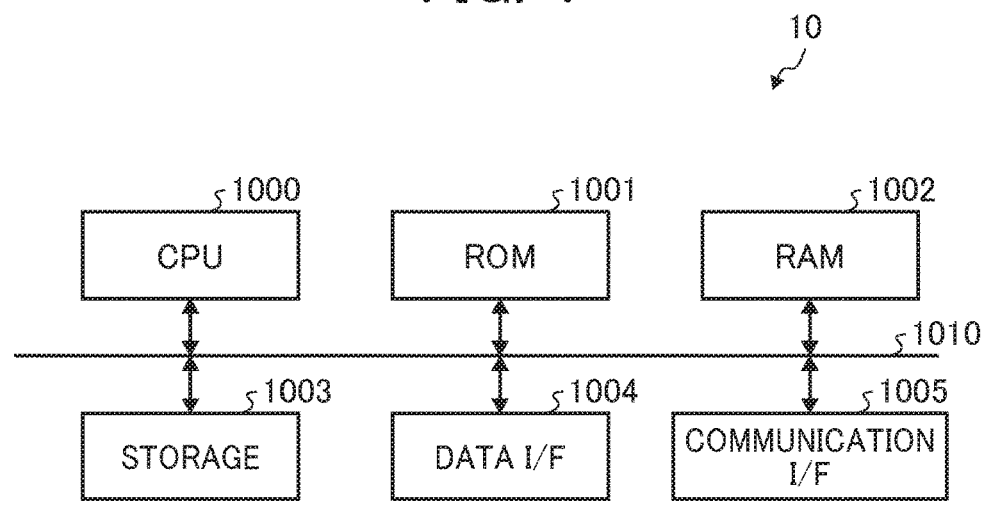
FIG. 4 is a block diagram of an example of a hardware configuration of a communication control apparatus, according to an embodiment of the present disclosure.

FIG. 4 is a block diagram of an example of a hardware configuration of the communication control apparatus 10 according to the embodiment. In FIG. 4, the communication control apparatus 10 includes a central processing unit (CPU) 1000, read only memory (ROM) 1001, random access memory (RAM) 1002, a storage 1003, a data interface (I/F) 1004, and a communication I/F 1005, and these components are connected in a mutually communicable manner via a bus 1010. Just as described, the communication control apparatus 10 can be implemented by having the same configuration as a configuration of a general computer.

The storage 1003 is constructed of a nonvolatile storage medium such as a hard disk drive or nonvolatile semiconductor memory (flash memory), and stores various programs and data used to operate the CPU 1000. The ROM 1001 stores in advance programs and the data used to activate and operate the communication control apparatus 10, for example. In accordance with the programs stored in the storage 1003 and the ROM 1001, the CPU 1000 is operated using the RAM 1002 as a work area, and controls the overall operation of the communication control apparatus 10. The communication I/F 1005 controls the communication via the network 3 in accordance with an instruction from the CPU 1000. The data I/F 1004 is an interface inputting/outputting the data into/from an external device, and Universal Serial Bus (USB) can be applied as the data I/F 1004, for example.

Figure 5:
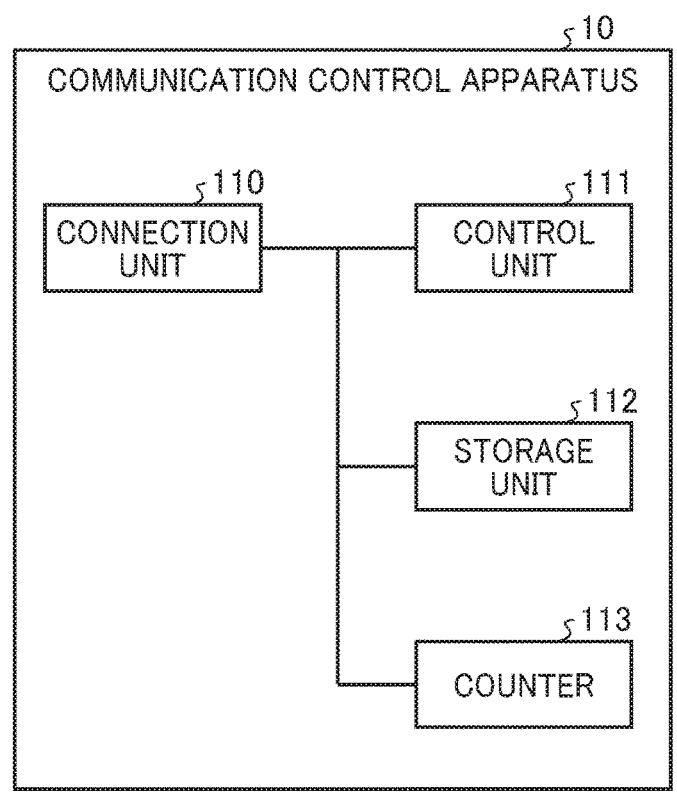
FIG. 5 is a block diagram of an example of a functional configuration of the communication control apparatus, according to an embodiment of the present disclosure.

FIG. 5 is a block diagram illustrating an example of a functional configuration of the communication control apparatus 10 according to the embodiment. In FIG. 5, the communication control apparatus 10 includes a connection unit 110, a control unit 111, a storage unit 112, and a counter 113. The connection unit 110, the control unit 111, the storage unit 112, and the counter 113 are configured by running the programs on the CPU 1000. However, the configurations of the connection unit 110, the control unit 111, the storage unit 112, and the counter 113 are not limited to the above. The connection unit 110, the control unit 111, the storage unit 112, and the counter 113 may be constructed of hardware circuits operated in cooperation with each other.

The connection unit 110 is implemented by one of the physical interface and the virtual interface. The connection unit 110 controls and connects the communication I/F 1005 to the network 3, and makes the communications via the network 3. An IP address of the connection unit 110 ("192.168.0.2" in the example illustrated in FIG. 1) is preset. The storage unit 112 stores the communication processing apparatuses connection list illustrated in FIG. 2 and a relay device WAN side IP address list, which will be described later.

The control unit 111 controls the overall operation of the communication control apparatus 10. In accordance with a predefined flow, the control unit 111 generates the flow entry to be applied to the flow table 210 provided in the communication processing apparatus 20. The control unit 111 transfers the generated flow entry to the communication processing apparatus 20. The communication processing apparatus 20 writes the transferred flow entry in the flow table 210 provided in the OFS 200 of the communication processing apparatus 20. The counter 113 updates a counter value in accordance with an instruction from the control unit 111.

A communication control program for realizing the functions of the communication control apparatus 10 is provided as one of a file in an installable format and a file in an executable format, and is stored in a computer-readable recording medium such as a compact disk (CD), a flexible disk (FD), or a digital versatile disk (DVD). However, the communication control program is not limited to the above. The communication control program may be stored in the computer connected to the network such as the Internet, and may be downloaded and provided via the network. Alternatively, the communication control program may be provided or distributed through the network such as the Internet.

The communication control program, which is provided and stored in the computer as described above, is supplied from the computer to the communication control apparatus 10 via the data I/F 1004 and stored in one of the storage 1003 and the ROM 1001, for example.

The communication control program has a module configuration including each of the above-described units (the connection unit 110, the control unit 111, the storage unit 112, and the counter 113). As actual hardware, the CPU 1000 reads and executes the communication control program from the storage medium such as the ROM 1001 or the storage 1003. As a result, each of the above-described units is loaded on a main storage unit such as the RAM 1002, and the connection unit 110, the control unit 111, the storage unit 112 and the counter 113 are generated on the main storage unit.

In another example, a program providing basic functions of the connection unit 110, the control unit 111, the storage unit 112, and the counter 113 can be stored in one of the ROM 1001 and the storage 1003 in advance to supply parameters or the like defining operations of the connection unit 110, the control unit 111, the storage unit 112, and the counter 113 to the communication control apparatus 10.

Figure 6:
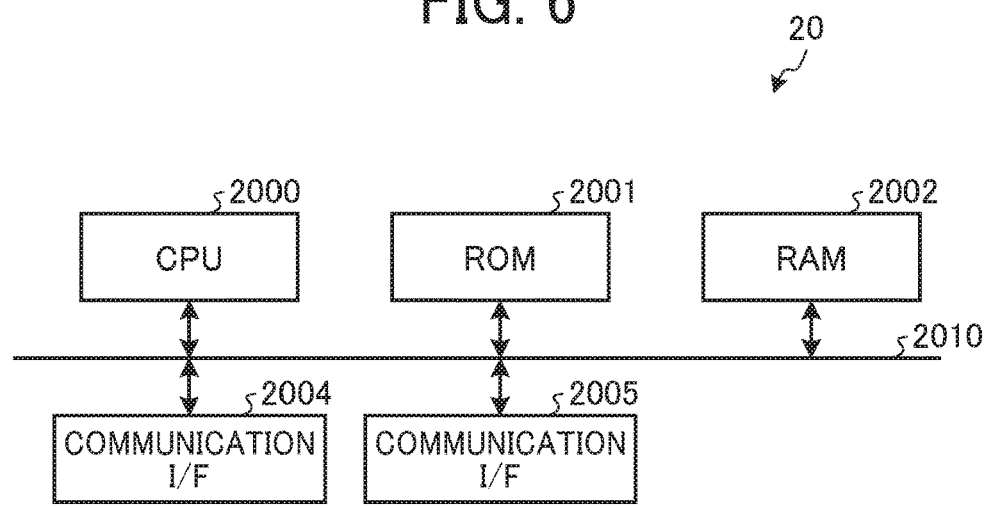
FIG. 6 is a diagram of an example of a hardware configuration of the communication processing apparatus, according to an embodiment of the present disclosure.

FIG. 6 is a diagram of an example of a hardware configuration of the communication processing apparatus according to the embodiment. In FIG. 6, the communication processing apparatus 20 includes a CPU 2000, ROM 2001, RAM 2002, a communication I/F 2004, and a communication I/F 2005, and these components are connected in a mutually communicable manner by a bus 2010. The hardware configuration of the communication processing apparatus 20 is not limited to the above. The ROM 2001, the RAM 2002, the communication I/F 2004, and the communication I/F 2005 may directly be connected to the CPU 2000, and the bus 2010 may not be provided.

The ROM 2001 stores in advance a program and the data used to operate the CPU 2000. In accordance with the program stored in the ROM 2001, the CPU 2000 is operated using the RAM 2002 as a work area, and controls the overall operation of the communication processing apparatus 20. The communication I/F 2004 and the communication I/F 2005 are hardware circuits respectively corresponding to the first connection unit 201a and second connection unit 201b described above, and each control the communications in accordance with an instruction of the CPU 2000. In the example illustrated in FIG. 6, it is assumed that the communication I/F 2004 is connected to the network 3 and the communication I/F 2005 is connected to the terminal 30.

Figure 7:
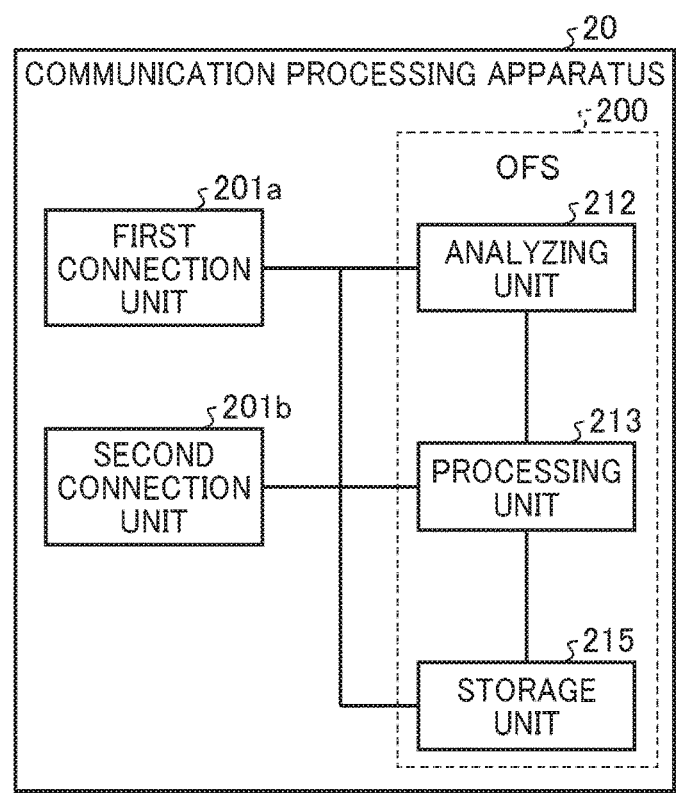
FIG. 7 is a diagram of an example of a functional block for illustrating functions of the communication processing apparatus, according to an embodiment of the present disclosure.

FIG. 7 is a diagram of an example of a functional block for illustrating functions of the communication processing apparatus according to the embodiment. In FIG. 7, portions corresponding to portions in FIG. 3 described above are denoted by the same reference numerals, and a detailed description on such portions will not be made. In FIG. 7, the communication processing apparatus 20 includes the OFS 200, the first connection unit 201a, and the second connection unit 201b. The CFS 200 includes an analyzing unit 212, a processing unit 213, and a storage unit 215.

The OFS 200, the first connection unit 201a, and the second connection unit 201b as well as the analyzing unit 212, the processing unit 213, and the storage unit 215 provided in the OFS 200 are configured by the program run on the CPU 2000. In another example, the OFS 200, the first connection unit 201a, and the second connection unit 201b as well as the analyzing unit 212, the processing unit 213, and the storage unit 215 provided in the OFS 200 may partially or entirely be constructed of hardware circuits operating in cooperation with each other.

In the OFS 200, the analyzing unit 212 analyzes the packet received by each of the first connection unit 201a and the second connection unit 201b, and extracts the header information. In accordance with an analysis result of the analyzing unit 212, the processing unit 213 processes the packet received by each of the first connection unit 201a and the second connection unit 201b. The storage unit 215 stores and reads the flow table 210, which is used when the processing unit 213 processes the packet in accordance with the analysis result of the analyzing unit 212, in and from the storage medium (for example, the RAM 2002).

In the above-described configuration, the detection apparatus 40 monitors at least one of the communication between the network 2 and the network 3 and the communication in the network 3, so as to detect static fraud such as of the destination, the port, or a content of the communication and dynamic fraud such as a cyberattack including a denial-of-service (DoS) attack and an infection activity. The fraud communication as described above will be referred to as "unauthorized communication" below. In addition to the DoS attack, a distributed DoS (DDoS) attack, a port scan attack, a ping of death (PoD) attack, and the like are considered as the cyberattacks, for example. The present disclosure is not limited to these types of the cyberattacks.

In response to detecting the unauthorized communication on the network 3, the detection apparatus 40 transmits information (referred to as "unauthorized terminal information" hereinafter) on a source terminal of the unauthorized communication to the communication control apparatus 10. On the basis of the unauthorized terminal information, the communication control apparatus 10 identifies the communication processing apparatus 20 mediating the unauthorized communication, and instructs the identified communication processing apparatus 20 to block the communication of the source terminal of the unauthorized communication.

FIG. 8 is a first table of an example of the unauthorized terminal information. FIG. 9 is a second table of the example of the unauthorized terminal information. FIG. 8 illustrates the example of the unauthorized terminal information in the case where the source terminal of the unauthorized communication is the terminal 30c FIG. 9 illustrates the example of the unauthorized terminal information in the case where the source terminal of the unauthorized communication is one of the terminal 30a and the terminal 30b under the control of the relay device 4 (that is, in the network where the relay device 4 is a gateway). Each of FIG. 8 and FIG. 9 illustrates the example in which the detection apparatus 40 detects such unauthorized communication that any of the terminals 30 on the inside of the gateway 5 is infected with a malicious program and conducts the DoS attack on an external server 6 (with an IP address "123.45.67.89").

In FIG. 8 and FIG. 9, as the unauthorized terminal information, an alert label (the "DoS ATTACK" in the examples illustrated in FIG. 8 and FIG. 9) indicating a content of the unauthorized communication, the IP address of the source terminal of the unauthorized communication, and an attack destination address (the IP address "123.45.67.89" of the external server 6 in this case) are associated with each other.

When detecting the unauthorized communication, the detection apparatus 40 transmits the unauthorized terminal information illustrated in one of FIG. 8 and FIG. 9 to the communication control apparatus 10.

As illustrated in FIG. 8, in the case where the source terminal of the unauthorized communication is the terminal (the terminal 30c in this case) in the same network 3 as the detection apparatus 40 and the communication control apparatus 10, the communication control apparatus 10 can specify the source terminal of the unauthorized communication (the terminal 30c in this case) on the basis of the IP address ("192.168.0.200" in this case) of the source terminal of the unauthorized communication included in the unauthorized terminal information. In this case, the communication control apparatus 10 instructs at least the communication processing apparatus 20c to block the communication with the IP address "192.168.0.200" of the terminal 30c, and thus can prevent the unauthorized communication on the network 3.

Meanwhile, as illustrated in FIG. 9, in the case where the source terminal of the unauthorized communication is the terminal (one of the terminal 30a and the terminal 30b in this case) under the control of the relay device 4 (that is, in the network where the relay device 4 is the gateway), the communication control apparatus 10 is notified of "192.168.0.10", which is the WAN side IP address of the relay device 4 as the IP address of the source terminal of the unauthorized communication. In this case, the communication control apparatus 10 instructs the communication processing apparatus 20a and the communication processing apparatus 20b to block the communications of the terminal 30a and the terminal 30b, and thus can prevent the unauthorized communication on the network 3. However, since the communication of one of the terminal 30a and the terminal 30b, which is not the source terminal of the unauthorized communication, is also blocked, the convenience is significantly degraded. For this reason, even in the case where a plurality of the terminals, the addresses of which are translated b r the relay device 4, exist on the network 3, the source terminal of the unauthorized communication is desirably specified, and the communication processing apparatus 20 corresponding to the source terminal of the unauthorized communication can desirably block the communication with the IP address of the source terminal of the unauthorized communication.

Figure 10:
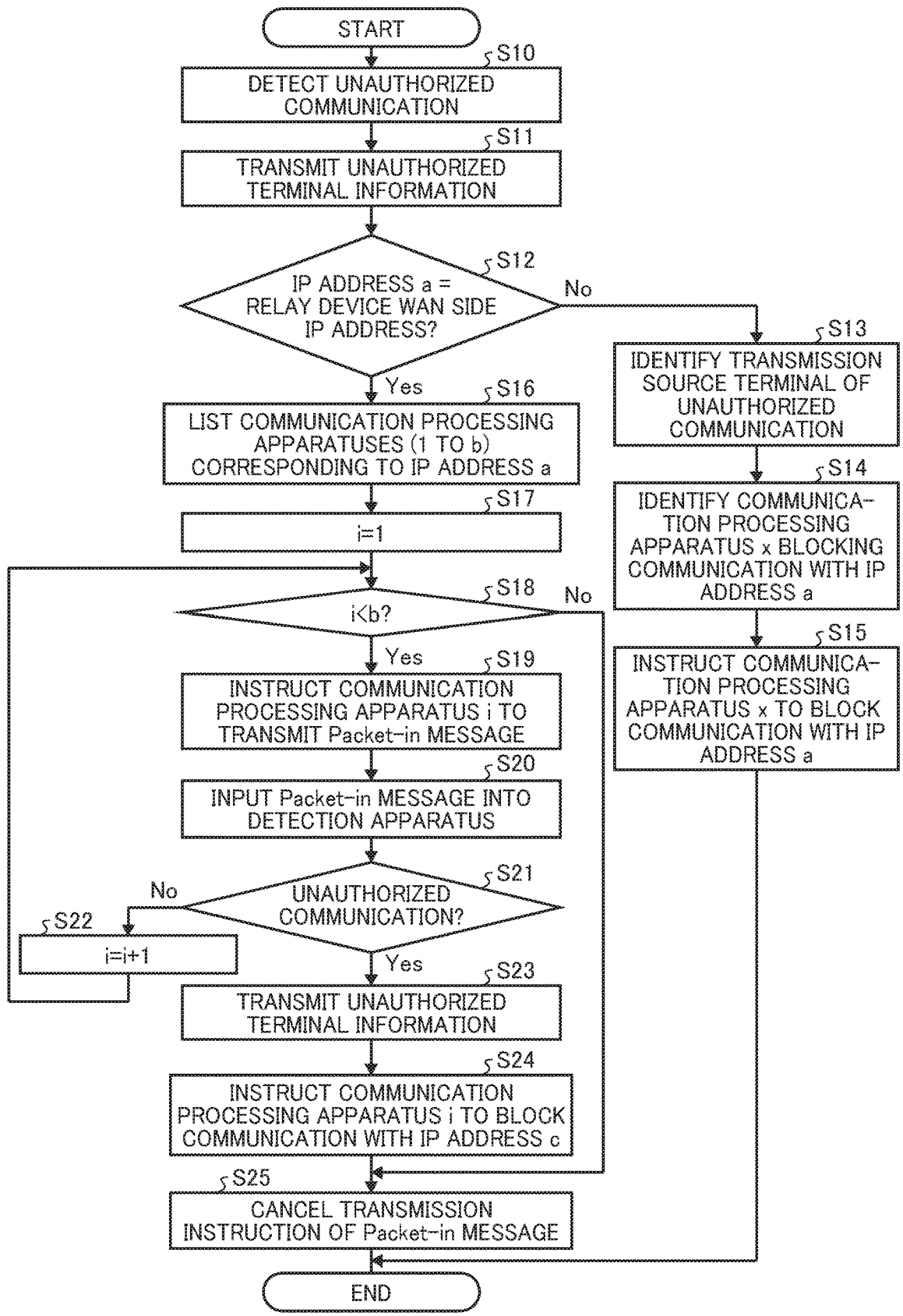
FIG. 10 is a flowchart of an example of an operation of controlling communication, according to an embodiment of the present disclosure.

FIG. 10 is a flowchart illustrating an example of an operation of controlling communication. The example of FIG. 10 illustrates an operation from detection of unauthorized communication by the detection apparatus 40 to the blocking of the communication with the IP address of the source terminal of the unauthorized communication by the communication system 1.

In FIG. 10, when the communication system 1 operates, the detection apparatus 40 starts monitoring unauthorized communication on the network 3.

In response to detecting unauthorized communication on the network 3 (step S10), the detection apparatus 40 transmits the unauthorized terminal information illustrated in one of FIG. 8 and FIG. 9, for example, to the communication control apparatus 10 (step S11). Specifically, as the unauthorized terminal information, the communication control apparatus 10 is at least notified of an IP address "a", which is predicted as the IP address of the source terminal of the unauthorized communication, and the IP address of the external server 6 as the destination (attack destination) address. In addition, as illustrated in one of FIG. 8 and FIG. 9, the alert label indicating the content of the unauthorized communication can be further notified as the unauthorized terminal information.

Next, the control unit 111 of the communication control apparatus 10 executes processing to identify the IP address "a", which is predicted as the IP address of the source terminal of the unauthorized communication (step S12). More specifically, the control unit 111 of the communication control apparatus 10 determines whether the IP address "a" is the WAN side IP address of the relay device 4.

FIG. 11 is a flowchart illustrating a first example of an operation of identifying the IP address "a" that is predicted as the IP address of the source terminal of the unauthorized communication. FIG. 11 illustrates an example in which the WAN side IP address of the relay device 4 is registered in the storage unit 112 of the communication control apparatus 10 in advance.

In FIG. 1, an example case where the single relay device 4 is provided on the network 3 is illustrated. In another example, in a case where a plurality of the relay devices 4 exists on the network 3, the WAN side IP addresses of the plurality of relay devices 4 are registered in the list.

In FIG. 11, the control unit 111 of the communication control apparatus 10 refers to the WAN side IP address list of the relay device 4 (referred to as the "relay device WAN side IP address list" hereinafter) registered in the storage unit 112 in advance (Step S12a-1), and determines whether the IP address "a", which is notified as the IP address of the source terminal of the unauthorized communication, exists in the relay device WAN side IP address list (step S12a-2).

FIG. 12 is a flowchart illustrating a second example of an operation of identifying the IP address "a" predicted as the IP address of the source terminal of the unauthorized communication. In FIG. 12, the control unit 111 of the communication control apparatus 10 refers to the communication processing apparatuses connection list (see FIG. 2) stored in the storage unit 112 (step S12b-1), and determines whether the IP address "a", which is notified as the IP address of the source terminal of the unauthorized communication, exists in the communication processing apparatuses connection list (step S12b-2).

When the IP address "a", which is notified as the IP address of the source terminal of the unauthorized communication, does not exist in the relay device WAN side IP address list in FIG. 11 (step S12a-2; No), or when the IP address "a", which is notified as the IP address of the source terminal of the unauthorized communication, does not exist in the communication processing apparatuses connection list in FIG. 12 (step S12b-2; No), the operation returns to FIG. 10, and the control unit 111 of the communication control apparatus 10 identifies the source terminal of the unauthorized communication with the IP address "a" as the IP address of the source terminal of the unauthorized communication (step S13).

Next, the control unit 111 of the communication control apparatus 10 identifies a communication processing apparatus x that is to block the communication with the IP address "a" identified as an IP address of the source terminal of the unauthorized communication (step S14).

Figure 13:
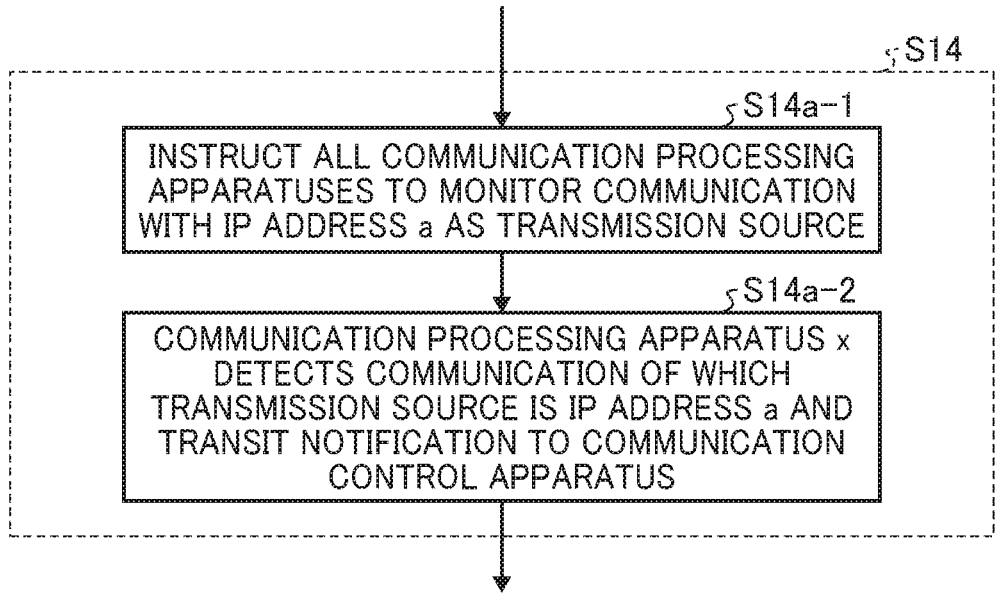
FIG. 13 is a flowchart of a first example of an operation of determining the communication processing apparatus that is to block communication with the IP address "a" as the source terminal of the unauthorized communication, according to an embodiment of the present disclosure.

FIG. 13 is a flowchart illustrating a first example of an operation of identifying the communication processing apparatus that is to block the communication with the IP address "a" of the source terminal of the unauthorized communication.

In FIG. 13, the control unit 111 of the communication control apparatus 10 instructs all the communication processing apparatuses 20 (the communication processing apparatuses 20a, 20b, 20c, and 20d in this case) via the connection unit 110 to monitor communication of which source is IP address "a" of the source terminal of the unauthorized communication (step S14a-1).

Any one (the communication processing apparatus x in this case) of all the communication processing apparatuses 20 detects the communication of which source is the IP address "a" of the source terminal of the unauthorized communication, and notifies the communication control apparatus 10 of the detected communication (step S14a-2). For example, in the example illustrated in FIG. 8, the communication processing apparatus 20c detects the communication of which source the IP address "a" of the source terminal of the unauthorized communication (the IP address "192.168.0.200" of the terminal 30c in this case), and notifies the communication control apparatus 10 of the detected communication.

Referring again to FIG. 10, the control unit 111 of the communication control apparatus 10 transmits, to the communication processing apparatus x (the communication processing apparatus 20c in the example illustrated in FIG. 8), which detects the communication of which source is the IP address "a" of the source terminal of the unauthorized communication, a blocking instruction for blocking the communication with the IP address "a" of the source terminal of the unauthorized communication via the connection unit 110 (step S15), and terminates the operation.

Figure 14:
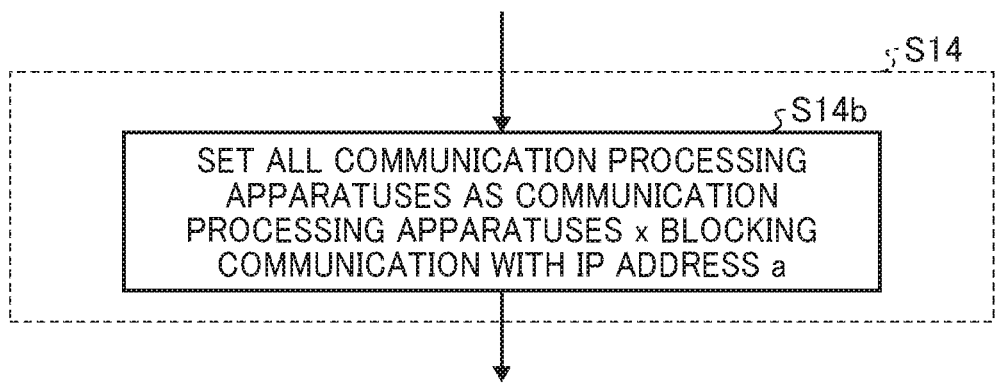
FIG. 14 is a flowchart of a second example of an operation of determining the communication processing apparatus that is to block the communication with the IP address "a" as the source terminal of the unauthorized communication, according to an embodiment of the present disclosure.

FIG. 14 is a flowchart illustrating a second example of an operation of determining the communication processing apparatus that is to block the communication with the IP address "a" of the source terminal of the unauthorized communication.

In FIG. 14, the control unit 111 of the communication control apparatus 10 sets all the communication processing apparatuses 20a, 20b, 20c, and 20d as the communication processing apparatuses x, each of which is to block the communication with the IP address "a" of the source terminal of the unauthorized communication (step S14b).

Referring again to FIG. 10, the control unit 111 of the communication control apparatus 10 transmits via the connection unit 110, to all the communication processing apparatuses x (the communication processing apparatuses 20a, 20b, 20c, and 20d), the blocking instruction for blocking communication with the IP address "a" of the source terminal of the unauthorized communication (step S15), and terminates the operation.

when the IP address "a", which is notified as the IP address of the source terminal of the unauthorized communication, exists in the relay device WAN side IP address list (step S12a-2; Yes) in FIG. 11, or when the IP address "a", which is notified as the IP address of the source terminal of the unauthorized communication, exists in the communication processing apparatuses connection list (step S12b-2; Yes) in FIG. 12, the control unit 111 of the communication control apparatus 10 refers to the communication processing apparatuses connection list illustrated in FIG. 2 to identify the communication processing apparatuses 20 (the communication processing apparatuses 20a, 20b in the example illustrated in FIG. 2) corresponding to the IP address "a" ("192.168.0.10" in the example illustrated in FIG. 9), which is notified as the IP address of the source terminal of the unauthorized communication (step S16). Then, the control unit 111 of the communication control apparatus 10 assigns, to n numbers (n is an integer equal to or larger than 1) of the identified communication processing apparatuses, "1" to "b" (b is an integer equal to or smaller than n).

The control unit 111 of the communication control apparatus 10 sets a counter value i (i is an integer equal to or smaller than b) of the counter 113 to "1" (step S17), and then determines whether the counter value i is smaller than "b" (Step S18).

when the counter value i is smaller than "b" (step S18: Yes), the control unit 111 of the communication control apparatus 10 instructs, via the connection unit 110, a communication processing apparatus i to transmit the packet-in message (Step S19). In the packet-in message, information on the packet at a stage of passing through the communication processing apparatus is notified as is. Thus, the packet-in message is not influenced by the NAPT function of the relay device 4.

Next, the control unit 111 of the communication control apparatus 10 inputs the packet-in message, which is transmitted from the communication processing apparatus i, into the detection apparatus 40 (step S20).

The detection apparatus 40 monitors the packet included in the packet-in message transmitted from the communication processing apparatus i, and determines whether the communication is unauthorized communication (Step S21).

When it is determined that the communication of the packet included in the packet-in message, which is transmitted from the communication processing apparatus i, is not unauthorized communication (step S21; No), the control unit 111 of the communication control apparatus 10 increments the counter value i of the counter 113 (Step S22), and the processing returns to step S18.

When it is determined that the communication of the packet included in the packet-in message, which is transmitted from the communication processing apparatus i, is the unauthorized communication (step S21; Yes), the detection apparatus 40 transmits the unauthorized terminal information including an IP address "c" of the source terminal of the unauthorized communication (the IP address "172.16.0.200" of the terminal 30a or the IP address "172.16.0.210" of the terminal 30b in the example illustrated in FIG. 1) to the communication control apparatus 10 (step S23).

Since the packet-in message including the packet, the communication of which is determined as the unauthorized communication, is transmitted from the communication processing apparatus i, the control unit 111 of the communication control apparatus 10 refers to the communication processing apparatuses connection list (see FIG. 2) stored in the storage unit 112 to transmit the blocking instruction for blocking the communication with the IP address c of the source terminal of the unauthorized communication to the communication processing apparatus i by designating the Datapath ID of the communication processing apparatus i (step S24). Thereafter, the control unit 111 of the communication control apparatus 10 cancels a transmission instruction of the packet-in message to the communication processing apparatus via the connection unit 110 (step S25), and terminates the operation.

When the counter value i is equal to or larger than "b" in step S18 (step S18; No), it is considered that the unauthorized communication is erroneously detected in the process of step S10. In this case, the control unit 111 of the communication control apparatus 10 cancels the transmission instruction of the packet-in message to the communication processing apparatus via the connection unit 110 (step S25), and terminates the operation.

In the above, an example operation is described in which the processes from step S19 to step S21 is executed by incrementing the counter value i of the communication processing apparatus i. In another example, the processes from step S19 to step S21 can be executed concurrently for the communication processing apparatuses identified in the process of step S16.

In addition, in the above description, an example is described in which, in the process of step S24, the communication processing apparatus i transmitting the packet-in message including the packet, the communication of which is determined as the unauthorized communication, is notified of the blocking instruction for blocking the communication with the IP address c of the source terminal of the unauthorized communication. In another example, the n number of the communication processing apparatuses identified in step S16 can be notified of the blocking instruction for blocking the communication with the IP address c of the source terminal of the unauthorized communication.

By executing the above-described communication control operation, the communication system 1 can identify the source terminal of the unauthorized communication and block the communication even in the case where the relay device 4 is provided in the network 3. This prevents the communications of the terminals other than the source terminal of the unauthorized communication from being blocked, thereby ensuring security of the network 3 without compromising convenience.

In the above description referring to FIG. 10, FIG. 11, and FIG. 12, an example is described in which determination is made in step S12 as to whether the IP address "a" is the WAN side IP address of the relay device 4, and when the determination result indicates that the IP address "a" is not the WAN side IP address of the relay device 4 (step S12a-1 and step S12b-1; No), the source terminal of the unauthorized communication is identified with the IP address "a" as the IP address of the source terminal of the unauthorized communication (step S13), thereby blocking the communication with the IP address "a" (Steps S14, S15). In another example, these steps S12, S13, S14, and S15 can be omitted and the processes of step S16 and subsequent steps can be executed after step S11. In such a case, when the detection apparatus 40 detects the unauthorized communication on the network 3 in step S10, the processes of step S16 and subsequent steps are executed, which may result in increase of a processing load. In order to reduce the processing load, as illustrated in FIG. 10, FIG. 11, and FIG. 12, the processes of steps S12, S13, S14, and S15 are desirably provided.

Next, a description will be made on the communication control rule at the time when the control unit 111 of the communication control apparatus 10 transmits, to the communication processing apparatus, which is to block the communication with the IP address of the source terminal of the unauthorized communication, (for example, the communication processing apparatus x in step S15 or the communication processing apparatus i in step S24 of the above-described communication processing), the blocking instruction for blocking the communication with the IP address of the source terminal of the unauthorized communication.

FIG. 15 is an illustration of a first example of a flow table constituting communication control rules. The flow table illustrated in FIG. 15 includes two flow entries, and each of the flow entries includes items of "Match (the condition)", "Action (the processing content)", and "Priority".

In the item "Match (the condition)", a matching rule in the flow entry is described. In the item "Action (the processing content)", processing to be executed on a flow by the processing unit 213 of the communication processing apparatus 20, the processing being executed in a case where it is determined that the input flow is a flow that matches the matching rule described in the item "Match (the condition)" of the flow entry. As described above, the flow is the aggregate of the communication having the same rule. More specifically, the flow is an aggregate of packets for which determination based on the matching rule described in the item "Match (the condition)" is made on the same condition.

In the item "Priority", priority of each of the flow entries is described. The priority becomes higher as a value is increased, and the value "1" is the lowest priority.

In an example illustrated in FIG. 15, in the two flow entries, the priority of the flow entry in a first row is "10", and the priority of the flow entry in a second row is "1".

In the example illustrated in FIG. 15, in the flow entry in the first row of the two flow entries, the item "Match (the condition)" describes that an IP address "src_ip" of a transmission source is an IP address "ip_a" of the source terminal of the unauthorized communication (src_ip=ip_a). In the item "Action (the processing content)", processing (Drop) indicating discard of a packet of the IP address is described. In the item "Priority", the value "10" is described.

In addition, in the example illustrated in FIG. 15, in the flow entry in the second row of the two flow entries the item "Match (the condition)" describes that an IP address is any IP address (any). The item "Action (the processing content)" describes that the communication processing apparatus 20 operates as a normal L2/L3 switch. In the item "Priority", the value "1" is described.

In the example illustrated in FIG. 15, the flow entry in the first row having the higher priority than the flow entry in the second row is firstly referred. Then, in the case where the description (src_ip=ip_a) of the item "Match (the condition)" defined in the flow entry of the first row is satisfied, that is, when the IP address "src_ip" of the transmission source is the IP address "ip_a" of the source terminal of the unauthorized communication (src_ip=ip_a), the communication processing apparatus 20 executes the processing (Drop) of discarding the packet of which transmission source is the IP address "ip_a".

In the case where the description (src_ip=ip_a) of the item "Match (the condition)" defined in the flow entry of the first row is not satisfied, that is, when the IP address "src_ip" of the transmission source is not the IP address "ip_a" of the source terminal of the unauthorized communication, the flow entry in the second row having the lower priority than the flow entry in the first row is referred. Then, the communication processing apparatus 20 operates as the normal L2/L3 switch.

In step S15 of the above-described communication processing, the control unit 111 of the communication control apparatus 10 generates the flow entry in the first row illustrated in FIG. 15 as the communication control rule (a second communication control rule) to make the communication processing apparatus x to block the communication with the IP address of the source terminal of the unauthorized communication, and transmits the communication control rule (the second communication control rule) to the communication processing apparatus x. In step S24 of the above-described communication processing, the control unit 111 of the communication control apparatus 10 generates the flow entry in the first row illustrated in FIG. 15 as the communication control rule (a first communication control rule) to make the communication processing apparatus i to execute the processing to block the communication with the IP address of the source terminal of the unauthorized communication, and transmits the communication control rule (the first communication control rule) to the communication processing apparatus i. As a result, the packet transmitted from the IP address "ip_a" of the source terminal of the unauthorized communication is discarded, and the communication with the IP address of the source terminal of the unauthorized communication is blocked.

FIG. 16 is an illustration of a second example of the flow table constituting the communication control rules, according to an embodiment of the present disclosure. FIG. 16 illustrates an example that includes a flow entry having the higher priority than the two flow entries illustrated in FIG. 15.

In the example illustrated in FIG. 16, the example that includes the flow entry having the higher priority than the two flow entries illustrated in FIG. 15 is illustrated. In this flow entry, the item "Match (the condition)" describes that the destination IP address "dst_ip" is a specific IP address "ip_op" (dst_ip=ip_op), and the item "Action (the processing content)" describes that the communication processing apparatus 20 operates as the normal L2/L3 switch. Further, in this flow entry, as the value of the item "Priority", a value "20" having the highest priority among the three flow entries is described.

In one of step S15 and step S24 of the above-described communication processing, in addition to the flow entry (the first communication control rule and the second communication control rule) in the second row illustrated in FIG. 16, the control unit 111 of the communication control apparatus 10 can generate the flow entry in the first row illustrated in FIG. 16 as the communication control rule (a third communication control rule) to make the communication processing apparatus execute processing to permit communication with the specific IP address "ip_op".

In the example illustrated in FIG. 16, an IP address of an operator terminal performing remote support of the terminal with the destination IP address dst_ip is set as the specific IP address ip_op. As a result, the remote support such as virus disinfection of the source terminal of the unauthorized communication can be performed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication system, comprising:
a communication control apparatus; and
one or more communication processing apparatuses,
the communication control apparatus and the one or more communication processing apparatuses residing on a network, wherein
the communication control apparatus comprises a memory configured to store a plurality of instructions which, when executed by one or more processors, causes the one or more processors to:
  instruct, in response to detection of unauthorized communication in the network, a particular communication processing apparatus corresponding to an IP address of a source terminal of the unauthorized communication to transmit a packet-in message, the particular communication processing apparatus being part of the one or more communication processing apparatuses;
  determine whether the packet-in message transmitted from the particular communication processing apparatus is the unauthorized communication;
  generate a first communication control rule, based on a determination result that indicates the packet-in message transmitted from the particular communication processing apparatus includes the unauthorized communication, the first communication control rule causing the particular communication processing apparatus to execute processing of blocking communication with the IP address of the source terminal of the unauthorized communication provided to the particular communication processing apparatus; and
  transmit the first communication control rule to the particular communication processing apparatus.

2. The communication system according to claim 1, wherein the one or more processors are further configured to cause the communication system to:
determine, based on the detection of the unauthorized communication in the network, whether the IP address of the source terminal of the unauthorized communication is an IP address of a device having a network address translation function; and
generate a second communication control rule, based on a determination result that indicates the IP address of the source terminal of the unauthorized communication is not the IP address of the device having the network address translation function, the second communication control rule causing the particular communication processing apparatus to execute the processing of blocking the communication with the IP address of the source terminal of the unauthorized communication; and
transmit the second communication control rule to the particular communication processing apparatus.

3. The communication system according to claim 2, further comprising:
a detection apparatus that comprises a memory and one or more detection apparatus processors, the memory is configured to store a plurality of instructions which, when executed by the one or more detection apparatus processors, causes the one or more detection apparatus processors to,
  detect the unauthorized communication and transmit unauthorized terminal information including the IP address of the source terminal of the unauthorized communication to the one or more communication processing apparatuses, wherein the one or more processors of the communication control apparatus are further configured to generate one of the first communication control rule and the second communication control rule based on the unauthorized terminal information.

4. The communication system according to claim 2, wherein
the one or more processors are further configured to cause the communication system to generate a third communication control rule that causes the particular communication processing apparatus to execute processing of permitting communication with a specific IP address in addition to one of the first communication control rule and the second communication control rule.

5. The communication system according to claim 3, wherein
the one or more processors of the communication control apparatus are further configured to cause the communication system to generate a third communication control rule that causes the particular communication processing apparatus to execute processing of permitting communication with a specific IP address in addition to at least one of the first communication control rule and the second communication control rule.

6. The communication system according to claim 4, wherein
the one or more processors are further configured to cause the communication system to set priority of the third communication control rule to be higher than at least one of priority of the first communication control rule and priority of the second communication control rule.

7. The communication system according to claim 5, wherein
the one or more processors of the communication control apparatus are further configured to cause the communication system to set priority of the third communication control rule to be higher than at least one of priority of the first communication control rule and priority of the second communication control rule.

8. The communication system according to claim 1, wherein the first communication control rule is a flow entry to be applied to a flow table of the particular communication processing apparatus.

9. The communication system according to claim 8, wherein the flow entry of the first communication control rule includes a priority of the first communication control rule.

10. The communication system according to claim 1, wherein the particular communication processing apparatus is configured to be connected to the communication control apparatus by a physical interface.

11. A communication control apparatus that resides on a network and controls communication in the network via one or more communication processing apparatus residing on the network, the communication controlling apparatus comprising a memory configured to store a plurality of instructions which, when executed by one or more processors, causes the one or more processors to:
instruct, in response to detection of unauthorized communication in the network, a particular communication processing apparatus corresponding to an IP address of a source terminal of the unauthorized communication to transmit a packet-in message, the particular communication processing apparatus being part of the one or more communication processing apparatuses;
determine whether the packet-in message transmitted from the particular communication processing apparatus is the unauthorized communication;
generate a first communication control rule, based on a determination result that indicates the packet-in message transmitted from the particular communication processing apparatus includes the unauthorized communication, the first communication control rule causing the particular communication processing apparatus to execute processing of blocking communication with the IP address of the source terminal of the unauthorized communication provided to the particular communication processing apparatus; and
transmit the first communication control rule to the particular communication processing apparatus.

12. The communication control apparatus according to claim 11, wherein
the one or more processors are further configured to:
determine, in response to detection of the unauthorized communication in the network, whether the IP address of the source terminal of the unauthorized communication is an IP address of a device having a network address translation function; and
generate a second communication control rule, based on a determination result that indicates the IP address of the source terminal of the unauthorized communication is not the IP address of the device having the network address translation function, the second communication control rule causing the particular communication processing apparatus to execute the processing of blocking the communication with the IP address of the source terminal of the unauthorized communication; and
transmit the second communication control rule to the particular communication processing apparatus.

13. A method of controlling communication, performed by a communication control apparatus residing on a network, via one or more communication processing apparatus residing on the network, the method comprising:
detecting unauthorized communication in the network;
instructing a particular communication processing apparatus corresponding to an IP address of a source terminal of the unauthorized communication to transmit a packet-in message, the particular communication processing apparatus being part of the one or more communication processing apparatuses;
determining whether the packet-in message transmitted from the particular communication processing apparatus is the unauthorized communication;
generating a communication control rule, based on a determination result that indicates the packet-in message transmitted from the particular communication processing apparatus includes the unauthorized communication, the communication control rule causing the particular communication processing apparatus to execute processing of blocking communication with the IP address of the source terminal of the unauthorized communication provided to the particular communication processing apparatus; and
transmitting the communication control rule to the particular communication processing apparatus.

* * * * *